US010601794B2

(12) United States Patent
Srinivasan et al.

(10) Patent No.: US 10,601,794 B2
(45) Date of Patent: Mar. 24, 2020

(54) PROVIDING ONLINE MEDIA CONTENT VIA A SATELLITE BROADCAST SYSTEM

(71) Applicant: Google Inc., Mountain View, CA (US)

(72) Inventors: Arvind Srinivasan, San Jose, CA (US); Adrian Isles, Alameda, CA (US); Robert Anderson, San Mateo, CA (US); Shipra Malhotra, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 151 days.

(21) Appl. No.: 15/364,164

(22) Filed: Nov. 29, 2016

(65) Prior Publication Data

US 2018/0034786 A1    Feb. 1, 2018

Related U.S. Application Data

(60) Provisional application No. 62/369,354, filed on Aug. 1, 2016.

(51) Int. Cl.
*G06F 21/00* (2013.01)
*H04L 29/06* (2006.01)
(Continued)

(52) U.S. Cl.
CPC ............ *H04L 63/0442* (2013.01); *H04L 9/14* (2013.01); *H04L 63/06* (2013.01); *H04L 63/10* (2013.01);
(Continued)

(58) Field of Classification Search
CPC ..... H04L 63/0442; H04L 63/06; H04L 63/10; H04L 65/4076; H04L 9/14; H04L 29/06;
(Continued)

(56) References Cited

U.S. PATENT DOCUMENTS

2002/0106086 A1   8/2002   Kamiya et al.
2003/0161081 A1   8/2003   Girardie
(Continued)

FOREIGN PATENT DOCUMENTS

EP    1150506 A2    10/2001
GB    2387505    *  10/2003   ............. G06F 21/10
(Continued)

OTHER PUBLICATIONS

Anonymous. Accelerator—YouTube. Retrieved on (Jul. 18, 2016) from https://www.youtube.com/yt/accelerator/#is-this-secure. 5 pages.
(Continued)

*Primary Examiner* — Kendall Dolly
*Assistant Examiner* — Kevin Ayala
(74) *Attorney, Agent, or Firm* — Lowenstein Sandler LLP

(57) ABSTRACT

A processing device of a media server selects a media item to be provided to users via a satellite broadcast system, encrypts the media item using an encryption key to generate an encrypted media item, and transmits the encrypted media item to the satellite broadcast system via a first communication protocol. The processing device receives a request from a user device for authorization to decrypt the encrypted media item obtained by the user device via a direct connection with the satellite broadcast system. The request is received by the media server via a second communication protocol that is different from the first communication protocol. The processing device determines whether the user device is authorized to decrypt the encrypted media item, and transmits a key for decrypting the encrypted media item in response to the user device being authorized to decrypt the encrypted media item.

20 Claims, 6 Drawing Sheets

(51) Int. Cl.
*H04N 21/61* (2011.01)
*H04L 9/14* (2006.01)
*H04W 84/06* (2009.01)

(52) U.S. Cl.
CPC ..... *H04L 65/4076* (2013.01); *H04N 21/6193* (2013.01); *G06F 2221/2111* (2013.01); *H04W 84/06* (2013.01)

(58) Field of Classification Search
CPC ............... H04N 21/6193; H04W 84/06; G06F 2221/2111
USPC ........................................................ 713/150
See application file for complete search history.

(56) References Cited

U.S. PATENT DOCUMENTS

| | | | | |
|---|---|---|---|---|
| 2007/0265970 | A1* | 11/2007 | Kahn | H04N 7/162 705/52 |
| 2011/0231867 | A1* | 9/2011 | Williams | H04N 21/2181 725/5 |
| 2013/0201905 | A1 | 8/2013 | Ling et al. | |
| 2016/0094891 | A1 | 3/2016 | Hall | |
| 2017/0339020 | A1* | 11/2017 | Khanna | H04L 41/12 |

FOREIGN PATENT DOCUMENTS

| | | | |
|---|---|---|---|
| GB | 2387505 | A | 10/2003 |
| JP | 2003152696 | A | 5/2003 |
| JP | 2007306074 | A | 11/2007 |
| JP | 2015046739 | A | 3/2015 |
| WO | WO01033546 | A1 | 10/2001 |
| WO | WO2011058764 | A1 | 5/2011 |

OTHER PUBLICATIONS

Greenberg, A. (Apr. 22, 2016). The Ingenious Way Iranians Are Using Satellite TV to Beam in Banned Internet. Wired. Retrieved on (Jul. 12, 2016) from https://www.wired.com/2016/04/ingenious-way-iranians-using-satellite-tv-beam-banned-data/. 14 pages.
Anonymous. About Toosheh. Retrieved on (Jul. 12, 2016) from https://www.toosheh.org/en/about. 2 pages.
Anonymous. How do I use Toosheh?. Retrieved on (Jul. 18, 2016) from https://www.toosheh.org/how-to-en.html?lang=en. 3 pages.
PCT Notification of Transmittal of the International Search Report and the Written Opinion of the International Searching Authority for PCT Application No. PCT/US2017/044930, dated Nov. 17, 2017, 13 pages.
JP Office Action for JP Application No. 2019/500840, dated Dec. 2, 2019, 11 pages.

* cited by examiner

US 10,601,794 B2

PROVIDING ONLINE MEDIA CONTENT VIA A SATELLITE BROADCAST SYSTEM

RELATED APPLICATION

This application claims the benefit under 35 U.S.C. § 119(e) of U.S. Provisional Application 62/369,354 filed on Aug. 1, 2016, which is hereby incorporated by reference.

TECHNICAL FIELD

Aspects and implementations of the present disclosure relate to online media content, and more specifically, to providing online media content via a satellite broadcast system.

BACKGROUND

Content-sharing platforms and their corresponding websites and mobile applications ("apps") enable user devices to share and play online streaming content, such as online streaming music and video. Streaming content may require a large amount of bandwidth and some connections may not provide the bandwidth necessary to stream content. For example, there are regions that have limited broadband access, where costs for high speed data connections are expensive relative to the region's average household income, and/or where high speed data infrastructure and/or mobile network infrastructure is poor. For example, a region may have network infrastructure for 2G networks, and delivering data and videos via the 2G networks is generally very slow.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device of a media server selects a media item to be provided for user consumption via a satellite broadcast system, transmits the media item encrypted using an encryption key to the satellite broadcast system via a first communication protocol, receives a request from a user device for authorization to decrypt the encrypted media item obtained by the user device via a direct connection with the satellite broadcast system. The request is received by the media server via a second communication protocol that is different from the first communication protocol. The processing device determines whether the user device is authorized to decrypt the encrypted media item and transmits a key for decrypting the encrypted media item in response to the user device being authorized to decrypt the encrypted media item.

In one implementation, the second communication protocol is Short Message Service (SMS) messaging, Multimedia Message Service (MMS) messaging, or voice and data cellular networking. In one implementation, the response is transmitted by the media server to the user device via at least one of SMS, messaging or MMS messaging, or voice and data cellular networking. In one implementation, prior to transmitting the encrypted media item to the satellite broadcast system, the processing device creates mapping data that associates the key with the encrypted media item, and stores the mapping data locally at the media server. In one implementation, the key is an asymmetric key.

In one implementation, the processing device determines whether the user device is authorized to decrypt the media item by extracting a media identifier and geographic data of the user device from the request, determining whether the media identifier and the geographic data satisfy one or more criteria, and determining that the user device is authorized to decrypt the encrypted media item if the media identifier and the geographic data satisfy the one or more criteria.

In one implementation, the processing device selects the media item based on at least one of a geographic location for consuming the media item, a device platform for consuming the media item, an operating system for consuming the media item, a ranking of the media item, a rating of the media item, a duration of the media item, a language associated with the media item, or content of the media item.

In an aspect of the present disclosure, a processing device of a user device establishes a direct connection with a device of a satellite broadcast system. The device stores encrypted media items provided by a media server. The processing device of the user device receives, via the direct connection, the encrypted media items from the device of the satellite broadcast system, sends, via a low-bandwidth communication connection between the user device and the media server, a request to the media server for authorization to decrypt the encrypted media items. and receives, via the low-bandwidth communication connection, a response from the media server indicating whether the user device is authorized to decrypt the encrypted media items.

In one implementation, the processing device of the user device determines a subset of the encrypted media items to receive from the device of the satellite broadcast system. The determining is based on user input indicating a selection of the subset of the encrypted online media items. In one implementation, the device is a satellite set top box. In one implementation, the direct connection between the user device and the satellite set top box is a Universal Serial Bus (USB) connection, a Bluetooth® connection, or an IEEE 802.11 (Wi-Fi®) connection. In one implementation, the processing device of the user device extracts keys from the response, and decrypts the encrypted media items using the keys. In one implementation, the request is sent to the media server via Short Message Service (SMS) messaging, Multimedia Message Service (MMS) messaging, or voice and data cellular networking. In one implementation, the processing device of the user device sends the request by determining geographic data of the user device, and sending the geographic data of the user device as part of the request.

An apparatus to provide online media content via a satellite broadcast system is also described. In one implementation, the apparatus includes means for selecting a media item to be provided for user consumption via a satellite broadcast system, means for transmitting the media item encrypted using an encryption key to the satellite broadcast system via a first communication protocol, means for receiving a request from a user device for authorization to decrypt the encrypted media item obtained by the user device via a direct connection with the satellite broadcast system. The request is received by the media server via a second communication protocol that is different from the first communication protocol. The apparatus includes means for determining whether the user device is authorized to decrypt the encrypted media item and means for transmitting a key for decrypting the encrypted media item in response to the user device being authorized to decrypt the encrypted media item.

In one implementation, the second communication protocol is Short Message Service (SMS) messaging, Multimedia Message Service (MMS) messaging, or voice and data cellular networking. In one implementation, the response is transmitted by the media server to the user device via at least one of SMS, messaging or MMS messaging, or voice and data cellular networking. In one implementation, the apparatus includes means for creating mapping data that associates the key with the encrypted media item prior to transmitting the encrypted media item to the satellite broadcast system, and means for storing the mapping data locally at the media server. In one implementation, the key is an asymmetric key.

In one implementation, the apparatus includes means for determining whether the user device is authorized to decrypt the media item by extracting a media identifier and geographic data of the user device from the request, means for determining whether the media identifier and the geographic data satisfy one or more criteria, and means for determining that the user device is authorized to decrypt the encrypted media item if the media identifier and the geographic data satisfy the one or more criteria.

In one implementation, the apparatus includes means for selecting the media item based on at least one of a geographic location for consuming the media item, a device platform for consuming the media item, an operating system for consuming the media item, a ranking of the media item, a rating of the media item, a duration of the media item, a language associated with the media item, or content of the media item.

In an aspect of the present disclosure, an apparatus includes means for establishing a direct connection with a device of a satellite broadcast system. The device stores encrypted media items provided by a media server. In one implementation, the apparatus includes means for receiving, via the direct connection, the encrypted media items from the device of the satellite broadcast system, means for sending, via a low-bandwidth communication connection between the user device and the media server, a request to the media server for authorization to decrypt the encrypted media items, and means for receiving, via the low-bandwidth communication connection, a response from the media server indicating whether the user device is authorized to decrypt the encrypted media items.

In one implementation, the apparatus includes means for determining a subset of the encrypted media items to receive from the device of the satellite broadcast system. The means for determining is based on user input indicating a selection of the subset of the encrypted online media items. In one implementation, the device is a satellite set top box. In one implementation, the direct connection between the user device and the satellite set top box is a Universal Serial Bus (USB) connection, a Bluetooth® connection, or an IEEE 802.11 (Wi-Fi®) connection. In one implementation, the apparatus includes means for extracting keys from the response, and means for decrypting the encrypted media items using the keys. In one implementation, the request is sent to the media server via Short Message Service (SMS) messaging, Multimedia Message Service (MMS) messaging, or voice and data cellular networking. In one implementation, the apparatus includes means for sending the request by means for determining geographic data of the user device, and means for sending the geographic data of the user device as part of the request.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
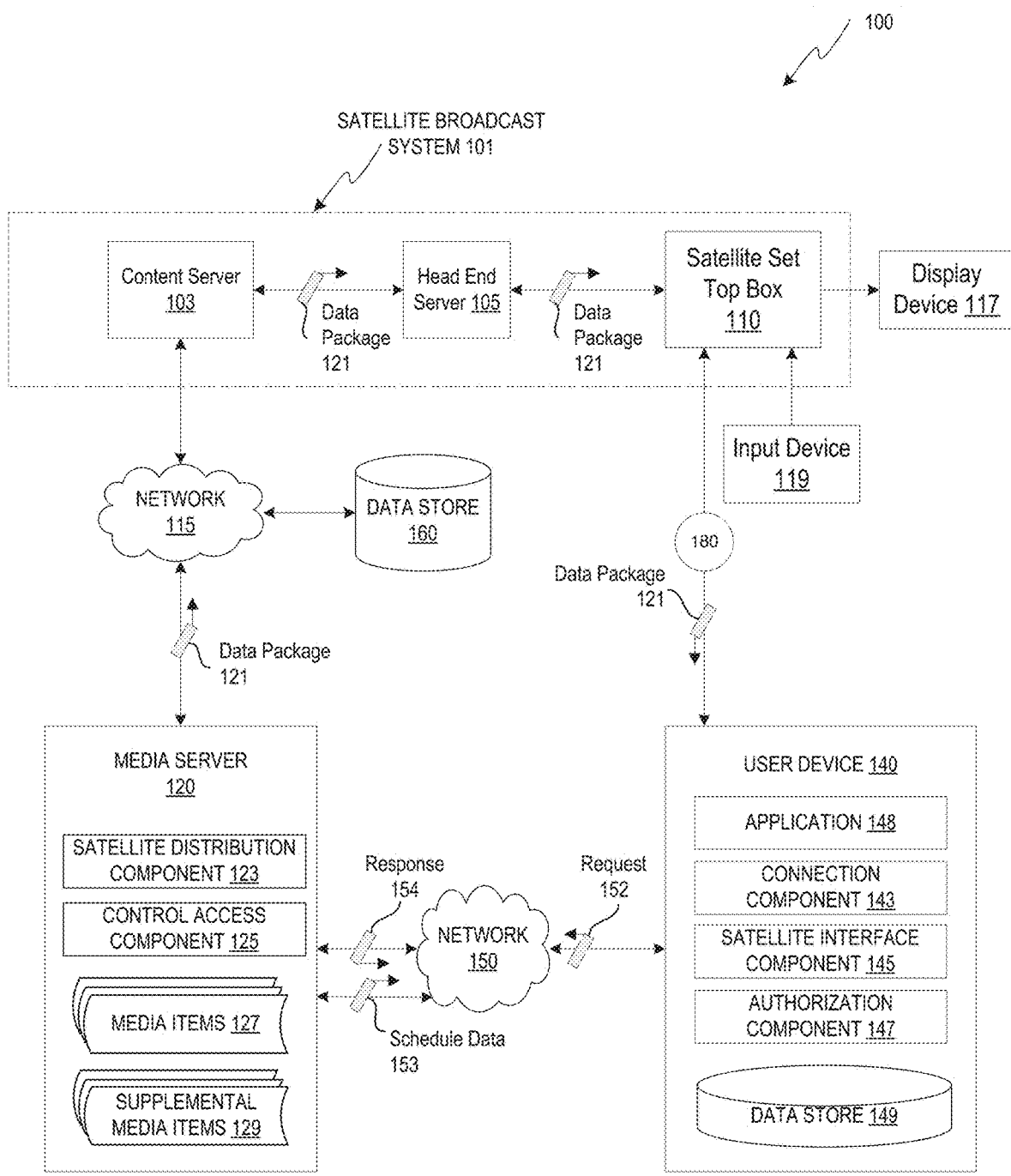
FIG. 1 illustrates an example of system architecture for sharing online media content with users via a satellite broadcast system, in accordance with one implementation of the disclosure.

Aspects and implementations of the present disclosure are directed to technology for sharing online media content with users via a satellite broadcast system. Online content is content shared via an Internet connection. Traditional content sharing technology may require a network connection with a large bandwidth in order to stream online content. In many emerging markets, the capabilities of the computing networks are limited and they often have low bandwidth, are unreliable, or unavailable. Some conventional content sharing systems enable content sharing but often provide unrestricted reproduction and access to the shared content, which may be undesirable for the content creators and/or providers and may be challenging to monitor for enforcement of copyright protection.

Aspects of the present disclosure address the above and other deficiencies by providing a content sharing system that allows users to share and watch online media content at low cost (via a satellite broadcast system, rather than Internet connections) while enabling copyright protection of the shared online media content. In particular, the content sharing system may provide a centralized access control for media content distributed to the user devices. The centralized access control can be enabled using one or more digital rights management (DRM) schemes to control the use, modification, and distribution of copyrighted media content.

In one example, the content sharing system may include a media server that provides media items (e.g., videos, audio) to the satellite broadcast system, and user devices can download the media items from the satellite broadcast system. The user devices may be mobile devices such as phones, tablets, or laptops and may be capable of storing the media items locally. Each user device may download the media items from the satellite broadcast system using a direct connection with the satellite broadcast system.

The media server can encrypt the media items, create a data package that includes the encrypted media items, and send the data package to a satellite broadcast system. The media server can send the data package to a satellite broadcast system via a high-speed Internet connection. The user device can establish a direct connection with a satellite device (e.g., satellite set top box) of the satellite broadcast system, and download one or more of the encrypted media items in the data package from the satellite device.

The direct connection between the user device and the satellite device (e.g., set top box) can be, for example, a Universal Serial Bus (USB) connection, a Bluetooth® connection, or an IEEE 802.11 (Wi-Fi®) connection. The user device can download the encrypted media items via the direct connection to the satellite device, rather than having to establish a high-speed Internet connection with the media server. The download of the one or more encrypted media items via the direction connection between the user device and the satellite device is performed as a low-bandwidth data transfer.

The encrypted media items downloaded to the user device are stored locally but the user device is restricted from playing the encrypted media items until the user device receives authorization from the media server. The user device can send a request to the media server for authorization to decrypt the encrypted media items. The user device can establish a low-bandwidth communication connection, using a communication protocol such as Short Message Service (SMS) messaging, with the media server for sending the request to the media server. The user device can use SMS messaging to communicate with the media server, rather than having to establish a high-speed Internet connection with the media server. The media server can then perform an authorization check to ensure that the user device is authorized to view the media item. The media server can respond, via the low-bandwidth communication, to the user device with one or more keys to enable the user device to decrypt and play the one or more corresponding media items.

The technology disclosed herein is advantageous because it enhances media item sharing by utilizing a direct connection between the satellite broadcast system and user devices that may have limited or no Internet access, and also providing a central mechanism to manage and monitor access to the shared media items. The technology may decrease the amount of bandwidth necessary to share media items, which may be beneficial to the media server, intermediate networking infrastructure (e.g., Internet Service Providers (ISPs), and user devices and may be particularly beneficial in emerging markets. In the past, each of the user devices typically had to access the media item from the media server via a high-speed Internet connection. In contrast, the technology of the present disclosure allows users to access the media item from a satellite broadcast system and only have to contact the media server to receive authorization to view the media item. Such an authorization is received via a low-bandwidth connection because the amount of network traffic required to obtain the authorization from the media server may be orders of magnitude less than the traditional amount of network traffic or bandwidth required to stream or download the media item directly from the media server.

Implementations of the present disclosure often reference videos for simplicity and brevity. However, the teachings of the present disclosure are applied to media items generally and can be applied to various types of content, including for example, video, audio, text, images, program instructions, etc.

FIG. 1 illustrates example system architecture 100, in accordance with one implementation of the disclosure. The system architecture 100 includes one or more media servers (e.g., media server 120), one or more user devices (e.g., user device 140), one or more satellite broadcast systems (e.g., satellite broadcast system 101), networks (e.g., network 115, network 150), and one or more data stores (e.g., data store 160).

Media server 120 may host content, such as media items 127 and supplemental media items 129. For brevity and simplicity, one media item 127 may be used as an example throughout this document. Media items 127 and supplemental media items 114 may be digital content chosen by a user, digital content made available by a user, digital content uploaded by a user, digital content chosen by a content provider, digital content chosen by a broadcaster, etc. Examples of media items 127 and supplemental media items 129 include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

Media server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items 127 and/or provide the media items 127 to the user via a satellite broadcast system 101. Media server 120 may be a part of a content sharing platform that may allow users to consume, upload, share, search for, approve of ("like"), dislike, and/or comment on media items 127. The content sharing platform may also include a website (e.g., a webpage) or application back-end software that may be used to provide a user with access to the media items 127.

The satellite broadcast system 101 can share media items 127, provided by the media server 120, to users of user devices (e.g., user device 140). For brevity and simplicity, one user device 140 may be used as an example throughout this document. The user device 140 can include an application 148 for playing the media items 127. User devices (e.g., user device 140) may each include computing devices such as personal computers (PCs), laptops, mobile phones, smart phones, tablet computers, netbook computers, network-connected televisions, etc. In some implementations, a user device 140 may also be referred to as a "client device."

Media items 127 and supplemental media items 129 may be consumed via the Internet and/or via a mobile device application (e.g., application 148). For brevity and simplicity, an online video (also hereinafter referred to as a video) may be used as an example of a media item 127 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform may store the media items 127 using the data store 160. In one example, media item 127 may be a video identified by a user of user device 140 and supplemental media item 129 may be an advertisement selected by media server 120 to be presented before, during or after presenting media item 127 on one or more of the user devices (e.g., user device 140).

Data store 160 can be a memory (e.g., random access memory), a drive (e.g., a hard drive, a flash drive), a database system, or another type of component or device capable of storing data. Data store 160 can include multiple storage components (e.g., multiple drives or multiple databases) that may span multiple computing devices (e.g., multiple server computers). Data store 160 can include a media cache that stores copies of media items 127 that are received from the media server 120.

The media server 120 can include a satellite distribution component 123 for communicating with the satellite broadcast system 101. The satellite distribution component 123 can select a subset of media items 127 that are to be provided to users via the satellite broadcast system 101. The selection of the subset of media items 127 is described in greater detail below in conjunction with FIG. 2. The subset of media items 127 can be selected, for example, based on geography of where the subset of media items 127 may be played, and/or a popularity ranking of the subset of media items 127. For example, the satellite distribution component 123 may select a subset being the current 50 most popular media items 127 (e.g., videos, audio, etc.).

The media server 120 can include a control access component 125 for implementing and enforcing digital rights management (DRM) of the media items 127. The control access component 125 can control which user devices (e.g., user device 140) can play the media items 127. The control access component 125 can encrypt the media items 127 that are to be provided to users via the satellite broadcast system 101 to limit the playback of the media items 127 only to those user devices that are authorized to play the media items 127, as described in greater detail below in conjunction with FIG. 2.

The satellite distribution component 123 can transmit and/or create one or more group identifiers (IDs) and can associate one or more group IDs with each of the media items 127 in the selected subset of media items 127. The group IDs can be based on attributes of the media items, such as, for example, language, type (e.g., music videos, sports videos, etc.) of content of the media items 127, ratings (e.g., Motion Picture Association of America (MPAA) film rating, TV Parental Guidelines ratings, user ratings, critics ratings, etc.) of the media items, etc. For example, there may be a group identifier for a particular language (e.g., Tamil) and satellite distribution component 123 can associate the particular language group identifier with media items 127 that are in the particular language.

The satellite distribution component 123 can transmit and/or create metadata for each of the media items 127 in the selected subset of media items 127, and schedule data 153 for the selected subset of media items 127, as described in greater detail below in conjunction with FIG. 2. The metadata for each media item 127 can include, for example, a media item identifier, a description of the media item 127, a creator or owner of the media item 127, a thumbnail for the media item 127, one or more ratings for the media item 127, a duration for the media item 127, statistics (e.g., number of likes, number of dislikes, number of shares, etc.) for the media item 127, and/or a publish date for the media item 127. For example, metadata for a video may include a title of the video as a media identifier, creator of the video, thumbnail for the video, and duration for the video. In one implementation, one or more group identifiers can be included as part of the metadata for each of the media items 127 in the selected subset of media items 127. The schedule data 153 can include, for example, one or more satellite channels of the satellite broadcast system 101 and one or more time slots which the satellite broadcast system 101 is to use to provide the selected subset of media items 127 to users. The schedule data 153 can be configurable and/or user-defined (e.g., media server owner, media server system administrator). The schedule data 153 can be based on, for example, content of the media items, rankings of the media items, ratings of the media items, preferences of creators/owners of the media items, etc.

The satellite distribution component 123 can send the schedule data 153 and/or the metadata for the selected media items 127 directly to the user device 140 via network 150. Network 150 can include infrastructure to provide low-bandwidth communication connections between the media server 120 and the user device 140. Low-bandwidth communication protocols can include, for example, Short Message Service (SMS) messaging, Multimedia Message Service (MMS) messaging, and voice and data cellular networking. For example, the satellite distribution component 123 can send a SMS message that contains the schedule data 153 and/or the metadata for the selected media items 127 to the user device 140.

The satellite distribution component 123 can create a data package 121 that includes the encrypted media items 127 and the metadata for each of the encrypted media items 127. In one implementation, the data package 121 includes the schedule data 153 for the encrypted media items 127. In another implementation, the schedule data 153 for the encrypted media items 127 is in a separate data package created by the media server 120.

In one implementation, the data package 121 includes one or more supplemental media items 129. A supplemental media item 129 can be an advertisement selected by media server 120 to be presented in association with (e.g., before, during or after) the presentation of media item 127 on one or more of the user devices (e.g., user device 140). In one implementation, the one or more supplemental media items 129 are encrypted by the control access component 125.

In one implementation, the data package 121 includes wrapped cryptography keys for the encrypted media items 127. In cryptography, a key is a piece of information (a parameter) that determines the functional output of a cryptographic algorithm. Key wrapping is a cryptographic construct that encapsulates key material and can be used to protect keys, for example, being transmitted over networks. The wrapped cryptography key can be an encryption key that is protected using a key wrapping algorithm. The control access component 125 can wrap the encryption keys used to encrypt the media items 127, as described in greater detail below in conjunction with FIG. 3.

The satellite distribution component 123 can send the data package 121 to one or more content servers (e.g., content server 103) of the satellite broadcast system 101 via network 115. In one implementation, the data package 121 that is sent to the satellite broadcast system 101 includes schedule data 153. In another implementation, the satellite distribution component 123 sends an additional data package that includes the schedule data 153. Network 115 can be a high-speed Internet connection, such as a Fiber connection. The content server 103 can send the data package 121 to one or more head end servers (e.g., head end server 105) via one or more satellites and satellite dishes of the satellite broadcast system 101. The content server 103 can be an FTP (File Transfer Protocol) server and can receive content from multiple content providers and multiple media servers. The head end server 105 can transmit the data package 121 to one or more satellite devices, such as, satellite set top boxes (e.g., satellite set top box 110) of the satellite broadcast system 101 via satellite communication links.

The content server 103 and head end server 105 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide the data package 121 to one or more satellite devices. The head end server 105 can include hardware, such as, modulators, amplifiers, combiners, etc. for beaning content (e.g., data package 121) to satellite dishes of the satellite broadcast system 101.

Satellite broadcasting is the distribution of multimedia content or broadcast signals over or through a satellite network. The broadcast signals can be sent via a satellite uplink (uploaded) to a geo-stationary artificial satellite for redistribution or retransmission to other predetermined geographic locations. Downlinks are then received by base stations such as small home satellite dishes or by base stations owned by the local cable network for redistribution to one on more satellite devices (e.g., satellite set top box 110).

A satellite set top box (STB) 110 or set top unit (STU) is an information appliance device of the satellite broadcast system 101. The satellite set top box 110 can contain a TV-tuner input and can display output to a display device 117 (e.g., television set). The satellite set top box 110 can store the data package(s) 121 that include the encrypted media items 127, metadata, and/or schedule data 153 in one or more local data stores (e.g., hard disk, cache memory) of the satellite set top box 110.

The user device 140 can include a satellite interface component 145 that cooperates with (or is part of) an application 148 to enable a user to select one or more media items 127 (e.g., videos) for downloading from the satellite set top box 110. A user of the user device 140 can use the application 148 to select which of the encrypted media items 127 to download from the satellite set top box 110. The application 148 can provide a user interface (UI) that displays information about the media items 127 that are available for download. The application 148 can extract information from the schedule data 153 and/or metadata received from the media server 120 via network 150, and populate and display the UI with the extracted information on the user device 140. For example, the UI may display the current 50 most popular media items 127 as being available for download, and the user may select to download only the top 10 most popular media items 127.

The user device 140 can be associated with one or more group identifiers. The user device 140 can be assigned one or more group identifiers based on, for example, attributes of the user device 140 and/or user (e.g., end-user) input. The attributes of the user device 140 can include, for example, language, region, and rating restrictions. The user input can include, for example, user preferences of type (e.g., music videos, sports videos, etc.) of content, preferred ratings (e.g., Motion Picture Association of America (MPAA) film rating, TV Parental Guidelines ratings, user ratings, critics ratings, etc.), language, etc. For example, the user device 140 can be associated with a group identifier for a particular language (e.g., Tamil). The one or more group IDs for the user device 140 can be stored in configuration data on a data store of the user device 140. In one implementation, the application 148 assigns the one or more group IDs for the user device 140 to the user device 140, for example, as part of the installation of the application 148 on the user device 140.

In one implementation, the UI on the user device 140 can display the channel(s) and/or time slot(s) for the media items 127 that are available for download. For example, the UI may indicate that a video titled "Summer Song" for "Rock-Band-XYZ" is available for download from 1:00 PM to 2:00 PM Pacific Standard Time on satellite channel "1003". In one implementation, the media items 127 that are available for download are the media items 127 that have one or more group IDs that match the one or more group IDs of the user device 140. The application 148 can determine which media items 127 have group IDs that meet one or more group criteria for the user device 140. If the user device 140 is assigned multiple group IDs, the group criteria can specify whether the group IDs of the media items 127 should match one or more the group IDs of the user device 140. For example, the user device 140 may be assigned the group ID for Tamil and the group ID for a "G" (general audience) rating, and the group criteria for the user device 140 may specify that only media items 127 that match both group IDS should be made available for download for the particular user device 140. In another example, the user device 140 may be assigned the group ID for Tamil, the group ID for a "G" rating, the group ID for a "PG" rating, and the group ID for a "R" rating. The group criteria for the user device 140 may specify that only media items 127 that match the group ID for Tamil and any of the group IDs for the ratings should be made available for download for the particular user device 140.

In another example, the user can use an input device 119 (e.g., a satellite set top box remote control) to select which of the encrypted media items 127 to download from the satellite set top box 110. The input device 119 can establish a connection (e.g., infrared connection, Bluetooth® connection) with the satellite set top box 110. The satellite set top box 110 can display information about the media items 127 that are available for download in a satellite UI presented on a display device 117 (e.g., television) that is coupled to the satellite set top box 110. In one implementation, the satellite set top box 110 receives the one or more group IDs of the user device 140 from the user device 140 and displays information about the media items 127 that have one or more group IDs that match the one or more group IDs of the user device 140. The satellite set top box 110 can extract information from the schedule data 153 and/or metadata received from the media server 120 via network 115 and populate the satellite UI with the extracted information. The user may select, via the input device 119, which encrypted media items 127 to download.

The information displayed in the UI of the application 148 on the user device 140 and in the satellite UI can include information for each encrypted media item 127 that is available for download, such as, a title, a brief description, one or more ratings, a duration, statistics (e.g., number of views, number of likes, numbers of dislikes), reviews, and/or comments.

The user device 140 can establish a direct connection 180 with the satellite set top box 110, and send data, via the direct connection 180, indicating the selection of which of the encrypted media items 127 are to be downloaded for the user to the user device 140. Connection component 143 can establish the direct communication connection between the user device 140 and the satellite set top box 110. The connection between the satellite set top box 110 and the user device 140 can be based on any wireless or wired communication technology. The wireless communication technology can include Bluetooth®, Wi-Fi® (IEEE 802.11), infrared, ultrasonic or other technology. The wired communication may include universal serial bus (USB), or other wired connection.

The satellite set top box 110 can make the encrypted media items 127 available for download at the schedule time slot(s) via the assigned satellite channel(s) according to the schedule data 153. The satellite broadcast system 101 can assign one or more satellite channels to one or more media servers 120 of the content sharing platform. For example, the media server 120 may be assigned satellite channel "1003". The satellite broadcast system 110 can assign the media server 120 one or more time slot(s) of other satellite channels that are not assigned to the media server 120. For example, the satellite channel "2223" may be assigned to a different content provider, but may have available time slot(s) that can be assigned to the media server 120.

In one implementation, the media server 120 designates one or more channels and/or one or more time(s) for sharing groups of media items 127. The groups of media items 127 can be based on attributes of the media items, such as, for example, language, type (e.g., music videos, sports videos, etc.) of content of the media items 127, ratings (e.g., Motion Picture Association of America (MPAA) film rating, TV Parental Guidelines ratings, user ratings, critics ratings, etc.) of the media items, etc. For example, the media server 120 may group media items 127 that have ratings of TV-Y, TV-Y7, TV-G, TV-PG, TV-14, G, PG, and/or PG-13 as a subset of media items 127, and may specify via the schedule data 153 that this particular subset of media items 127 should be made available via a particular satellite channel that is assigned to the media server 120 and/or to particular time slot(s) that are assigned to the media server 120. In another example, the media server 120 may group media items 127 that are in a particular language (e.g., French), and may specify via the schedule data 153 that this particular subset of media items 127 should be made available via the particular satellite channel(s) and/or time slot(s) that are assigned to the media server 120.

The satellite set top box 110 can output, at the scheduled time(s) and on the specified satellite channel(s), generic data (e.g., blue screen image, black screen image, blank screen image, etc.) on the display device 117 (e.g., television), and concurrently send, via the direct connection 180, the files for the selected encrypted media items 127 to the user device 140. Data can be transmitted from the set top box 110 to the user device 140 using, for example, media transfer protocol (MTP). In one implementation, at the scheduled time(s), the satellite set top box 110 may be tuned to a satellite channel that is not specified in the schedule data 153 and is not assigned to the media server 120, and the set top box 110 can display the appropriate content for that satellite channel, and concurrently send, via the direct connection 180, the files for the selected encrypted media items 127 to the user device 140. For example, at the schedule time(s), the satellite set top box 110 may be tuned to a satellite Sports Network channel that is not specified in the schedule data 153 and is not assigned to the media server 120, and the set top box 110 can display the appropriate sports content for that Sports Network channel, and concurrently send in the background, via the direct connection 180, the files for the selected encrypted media items 127 to the user device 140. After the scheduled time slots(s), the satellite set top box 110 can remove the files pertaining to the subset of encrypted media items 127 from its local data store (e.g., memory). The local data store is then available to store new files.

In one implementation, if satellite set top box 110 is directly connected to the user device 140 at the schedule time slot(s) and if no user selection of media items is made, the satellite set top box 110 can send all of the encrypted media items for the scheduled time slot(s), and the corresponding data (e.g., metadata, wrapped keys, etc.) to the user device 140. In another implementation, if satellite set top box 110 is directly connected to the user device 140 at the schedule time slot(s), the satellite set top box 110 can send all of the encrypted media items for the scheduled time slot(s), and the corresponding data (e.g., metadata, wrapped keys, etc.) to the user device 140. The application 148 on the user device 140 can delete the encrypted media items, which the user did not select, and the corresponding data, from the user device 140. The user device 140 can store the downloaded encrypted media items 127 in a local data store (e.g., data store 149). Data store 149 may be a memory (e.g., random access memory), a drive (e.g., a hard drive, a flash drive), or another type of component or device capable of storing data. Data store 149 may include a media cache that stores copies of media items that are received from a device (e.g., satellite set top box 110) of the satellite broadcast system 101.

In another example, the user device 140 may not have a direct connection 180 at the scheduled time(s) for which the selected encrypted media items 127 are being made available for download by the satellite set top box 110, and the satellite set top box 110 can store, at the scheduled time slot(s), the files for the selected encrypted media items 127 in a data store on the satellite set top box 110. When the user device 140 establishes a direct connection 180 with the satellite set top box 110, the satellite set top box 110 can transfer, via the direct connection 180, the files for the selected encrypted media items 127 from the data store on the satellite set top box 110 to the user device 140. The satellite set top box 110 can then remove the files pertaining to the subset of encrypted media items 127 from its local data store (e.g., memory), and the memory is then available for use.

The user device 140 is restricted from playing the downloaded encrypted media items 127 until the user device 140 receives the decryption keys from the media server 120. The user device 140 can include an authorization component 147 that has functionality to enable the user device 140 to receive the decryption keys and decrypt an encrypted media item 127. The authorization component 147 can send a request 152 to the media server 120 for authorization to decrypt the encrypted media items 127. The request for authorization is described in greater detail below in conjunction with FIG. 4. The user device 140 can establish a low-bandwidth communication connection via network 150 with the media server 120 for sending the request to the media server 120.

The control access component 125 in the media server 120 can prevent unauthorized access to the media item 127. The control access component 125 can receive the request 152 for authorization and perform an authorization check to determine whether the user device 140 is authorized to decrypt and view the media items 127. The authorization check is described in greater detail below in conjunction with FIG. 5. If the user device 140 is authorized, the control access component 125 can send a response 154, via the low-bandwidth communication connection, to the user device 140 with one or more decryption keys to enable the user device 140.

The authorization component 147 in the user device 140 can then use the one or more decryption keys to decrypt the media items 127, as described in greater detail below in conjunction with FIG. 2 and FIG. 5. The user device 140 can include a media viewer (e.g., application 148) that allows users to view decrypted media items 127. The media viewer may present images, videos, audio, web pages, documents, etc. The media viewer may render, display, and/or present the content of the media items 127 to a user. The media viewer may also display an embedded media player. According to aspects of the disclosure, the media viewer may be a content sharing platform application for users to share, record, edit, and/or upload content to the content sharing platform. The media viewer may be provided to user device 140 by media server 120. For example, the media viewer may be a mobile application that is installed and executed on user device 140.

The authorization component 147 can perform a data integrity check of the decrypted media items 127 prior to the decrypted media items 127 being played. For example, the authorization component 147 can perform a checksum function using data of the frames of a decrypted media item 127 as input to verify the data integrity of the decrypted media item 127. In another example, the authorization component 147 can perform a hash function using data of the frames of a decrypted media item 127 as input. The hash can be, for example, a Verifying Integrity of PERipherals (VIPER) hash. Data integrity is described in greater detail below in conjunction with FIG. 4.

In general, functions described in one implementation as being performed by the content sharing platform can also be performed on the user device 140 in other implementations, if appropriate. In addition, the functionality attributed to a particular component can be performed by different or multiple components operating together. The content sharing platform and media server 120 can also be accessed as a service provided to other systems or devices through appropriate application programming interfaces, and thus is not limited to use in websites. Although implementations of the disclosure are discussed in terms of a media server and a content sharing platform, implementations may also be generally applied to any type of social network providing digital content and connections between users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

Figure 2:
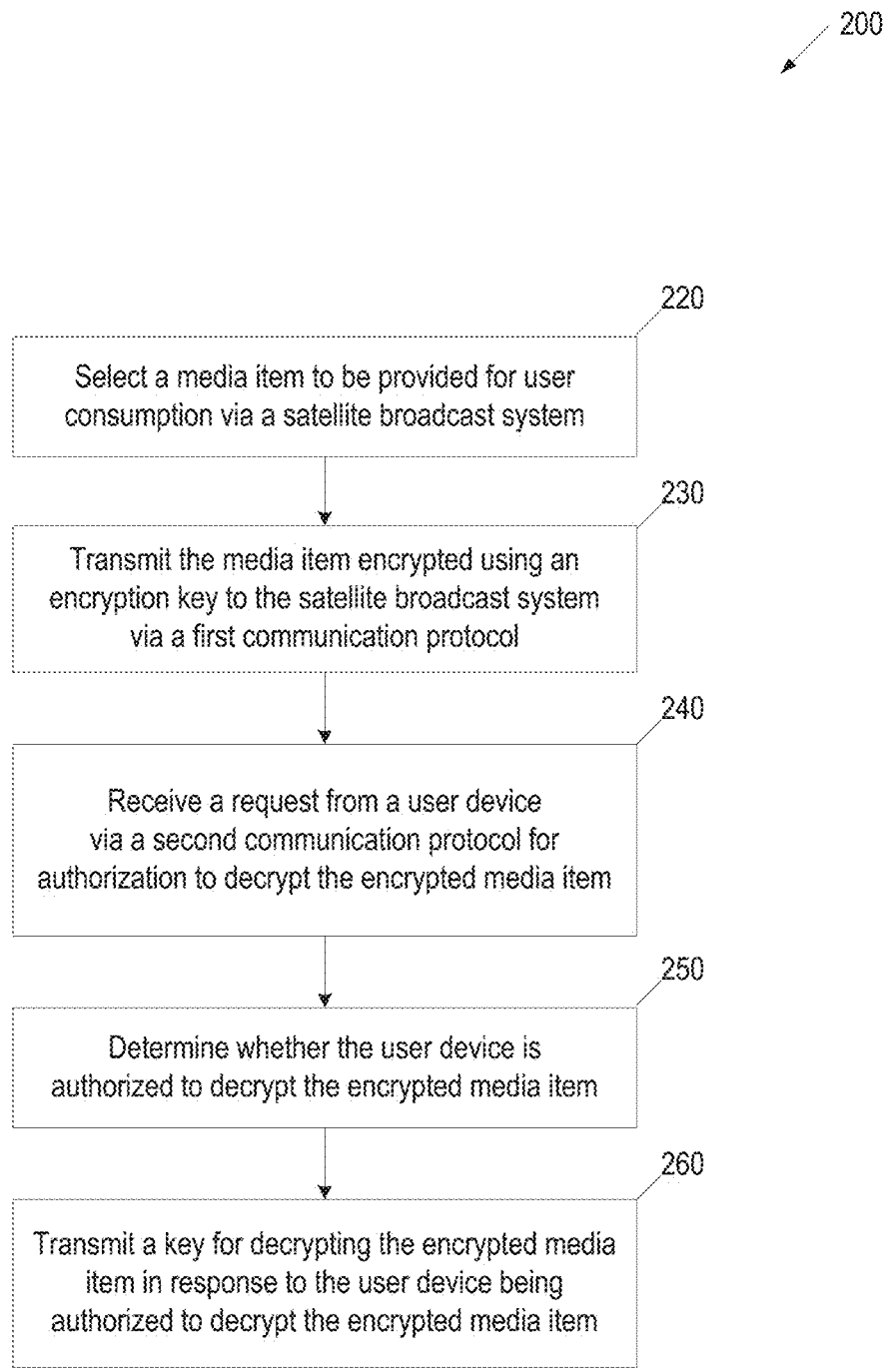
FIG. 2 depicts a flow diagram of a method for sharing online media content with users via a satellite broadcast system, in accordance with one implementation of the present disclosure.

FIG. 2 depicts a flow diagram of a method 200 for sharing online media content with users via a satellite broadcast system, in accordance with one implementation of the present disclosure. The method 200 is performed by processing logic that may comprise hardware (circuitry, dedicated logic, etc.), software (such as is run on a general purpose computer system or a dedicated machine), or a combination of both. In one implementation, the method is performed by a satellite distribution component 123 and/or a control access component 125 in a media server 120 of FIG. 1, while in some other implementations one or more blocks of FIG. 2 may be performed by another machine. In one implementation, a processing device of a media server computing machine (e.g., media server 120 in FIG. 1) performs method 200.

At block 220, the processing device selects a media item to be provided for user consumption via a satellite broadcast system. The processing device can select more than one media item to be provided to one or more users via the satellite broadcast system. The processing device can select the media item based one or more factors, such as, a geographic location, a device platform for consuming the media item, an operating system for consuming the media item, rankings of the media item, language associated with the media item, duration of the media item, rating of the media item, and content of the media item. The processing device can be coupled to one or more platforms (e.g., a recommendation platform, a content sharing platform, a search platform, a social network platform, etc.) to receive data for determining which of the media item(s) to select for sharing with users via a satellite broadcast system.

The media item can be encrypted using an encryption key to generate an encrypted media item. The encryption of the media item is described in greater detail below in conjunction with FIG. 3. In one implementation, the processing device of the media server encrypts the media item. In another implementation, a processing device of a different server (e.g., encryption server) encrypts the media item. At block 230, the processing device transmits the encrypted media item to the satellite broadcast system via a first communication protocol. The first communication protocol can be a high-speed Internet protocol. An example of broadband technology that provides high-speed Internet access is Fiber networks. The processing device creates a data package that contains the encrypted media item and other information (e.g., metadata, schedule data, supplemental media items), and sends the data package to the satellite broadcast system, as described in greater detail below in conjunction with FIG. 3. The processing device can also send schedule data for the encrypted media item to the user device via a different network (e.g., network 150 in FIG. 1) using a second communication protocol (e.g., SMS messaging, MMS messaging, and voice/audio and data cellular networking).

At block 240, the processing device receives a request from a user device via a second communication protocol for authorization to decrypt the encrypted media item. The second communication protocol is a low bandwidth protocol, such as, for example, SMS messaging or MMS messaging, and voice/audio and data cellular networking. For example, the request can be received as a SMS message from the user device.

At block 250, the processing device determines whether the user device is authorized to decrypt the encrypted media item. The processing device can make the determination based on one or more factors, such as, geographic locations for playing the media item, authorization by the owner to play the media item, device platform (e.g., mobile device, desktop device) for playing the media item, operating system of the device playing the media item, credentials of a user, or a combination of such, as described in greater detail below in conjunction with FIG. 5.

At block 260, the processing device transmits a key for decrypting the encrypted media item in response to the user device being authorized to decrypt the encrypted media item. The processing device can transmit the key to the user device via SMS, messaging or MMS messaging, and/or voice/audio and data cellular networking. For example, the processing device can send a SMS message that contains the key, and/or a MMS message that contain the key to the user device. In another example, the processing device can encode they key into audio data, and send the response as audio data to the user device over a voice call.

Figure 3:
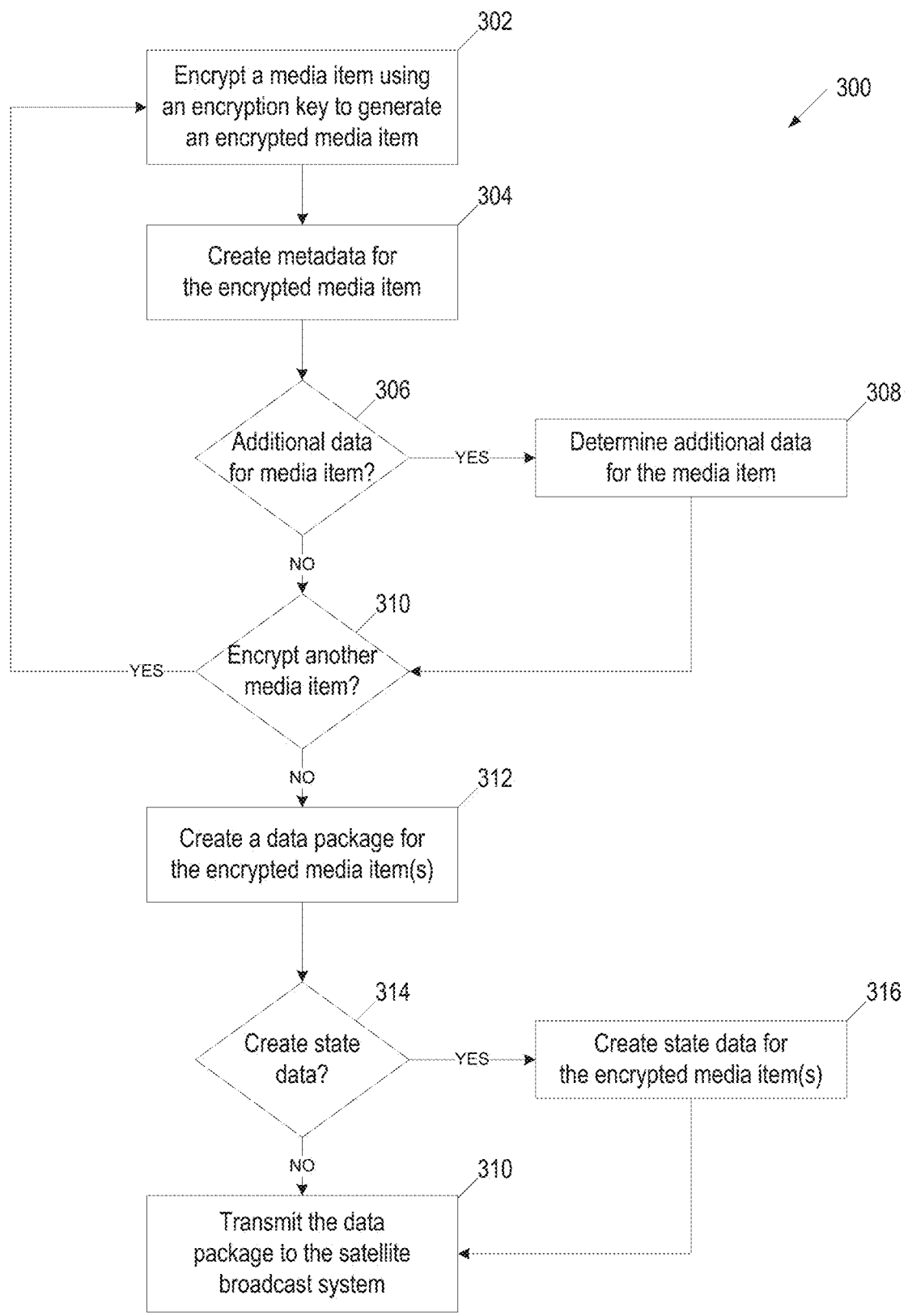
FIG. 3 depicts a flow diagram of a method for providing a data package for sharing online media items with users via a satellite broadcast system, in accordance with one implementation of the present disclosure.

FIG. 3 depicts a flow diagram of a method 300 for providing a data package for sharing online media items with users via a satellite broadcast system, in accordance with one implementation of the present disclosure. The method 300 is performed by processing logic that may comprise hardware (circuitry, dedicated logic, etc.), software (such as is run on a general purpose computer system or a dedicated machine), or a combination of both. In one implementation, the method is performed by a satellite distribution component 123 and/or a control access component 125 in a media server 120 of FIG. 1, while in some other implementations one or more blocks of FIG. 2 may be performed by another machine. In one implementation, a processing device of a media server computing machine (e.g., media server 120 in FIG. 1) performs method 300.

At block 302, the processing device encrypts a media item using an encryption key to generate an encrypted media item. The media item can be a file in a raw media format. For example, for video, the media item can be a file in a raw video file format. Examples of raw video file formats include, Apple QuickTime Movie (.MOV extension), Moving Pictures Expert Group 4 (.MPEG4 extension, .MP4 extension), Audio Video Interleave (.AVI extension), and Windows Media Video (.WMV extension). For example, the media item may be for a video titled "Summer Song" for "Rock-Band-XYZ." The video may be in a raw AVI (Audio Video Interleave) video file format.

The processing device can generate an encryption key for the media item. The encryption key can include a piece of information that determines the functional output of a cryptographic function and can be used to encrypt the media item. The processing device can generate the encryption key using a random number generator, a pseudorandom number generator, a key derivation function, other mechanism, or a combination thereof. The processing device can seed the key generation using information of the media server, such as a media server identifier, a time stamp, an IP address, a MAC address, other information, or a combination thereof.

The processing device can use the encryption key to encrypt the raw media file (e.g., raw video file) for the media item. For example, the processing device can use the encryption key to encrypt the raw AVI file for the "Summer Song" video. The processing device can use the encryption key to encrypt one or more media items. In one example, each media item may be encrypted using a different encryption key. In another example, multiple (e.g., all) media items can be encrypted using the same encryption key.

In one implementation, the processing device encrypts the media item using a symmetric key cryptography system that uses a single shared key, such as, Data Encryption Standard (DES) or Advanced Encryption Standard (AES). In other implementation, the processing device also or alternatively encrypts the media item using an asymmetric cryptography or public-key cryptography system that uses a pair of keys (e.g., public key and a private key), such as, Rivest-Shamir-Adleman (RSA).

At block 304, the processing device creates metadata for the encrypted media item. The metadata for the media item can include a media item identifier, a description of the media item, a creator or owner of the media item, a thumbnail for the media item, one or more ratings for the media item, a duration for the media item, statistics (e.g., number of likes, number of dislikes, number of shares, etc.) for the media item, and/or a publish date for the media item. The ratings can include, for example, film review aggregator ratings, MPAA film rating, TV Parental Guidelines ratings, or user ratings, or any combination of such. In one implementation, the processing device encrypts the metadata using the encryption key of the media item.

At block 306, the processing device determines whether there is additional data for the media item. The additional data can be, for example, a wrapped cryptography key for the media item, one or more supplemental media items (e.g., advertisement content) for the media item, and/or schedule data for the media item. The processing device can make the determination based configuration data that is stored in a data store (e.g., data store 160 in FIG. 1) that is coupled to the media server. The configuration data can be configurable and/or user-defined (e.g., system administrator defined). If there is no additional data for the media item, the processing device determines whether to encrypt another media item at block 310.

If there is additional data for the media item, the processing device determines the additional data at block 308. The processing device can create the additional data for the media item. For example, the processing device can wrap the encryption key using a media server key to create a wrapped cryptography key as the additional data for the media item. The media server key can be a public key that is generated by the media server. The processing device can use the media server key along with a key encapsulation mechanism to secure the encryption key. In one example, the processing device may use a symmetric key cryptography system to encrypt the media item and may use an asymmetric cryptography system to wrap the encryption key. As discussed above, the asymmetric cryptography or public-key cryptography system may be the same or similar to RSA.

In another example, the processing device can determine advertisement data as the additional data for the media item at block 308. The processing device can be coupled to a recommendation platform and/or a promotion platform that can provide the processing device with advertisement data for the media item. The advertisement data can include one or more digital images (e.g., JPEGS) and/or one or more audio clips to create an advertisement that can be presented before, during or after presenting the media item on one or more of the user devices (e.g., user device 140 in FIG. 1).

At block 310, the processing device determines whether to encrypt another media item. The processing device can select a subset of the media items that are stored on the media server to encrypt for sharing with users via a satellite broadcast system. The processing device can select the subset of the media items based on one or more factors, such as, a geographic location for consuming the media items, a geographic location associated with the satellite device that provides the media items to users, a device platform for consuming the media items, an operating system for consuming the media items, content of the media item, language associated with the media item, duration of the media items, ratings of the media items, and rankings of the media item. For example, the processing device may select a subset being the current 20 most popular media items (e.g., videos, audio, etc.), and the processing device can determine whether all of the selected subset of media items have been encrypted.

If there is another media item in the subset of media items to be encrypted, the processing device returns to block 302 to encrypt the other media item using an encryption key to generate another encrypted media item. In one example, the processing device can use the same encryption key to encrypt multiple (e.g., all) media items of the subset of media items. In another example, each media item in the subset of media items may be encrypted using different encryption keys.

If there is not another media item in the subset of media items to be encrypted, the processing device creates a data package for the encrypted media items at block 312. The data package can be in a video file format, such as MP4. The processing device can encode the encrypted raw media files (e.g., encrypted raw video files) for the subset of media items in the data package (e.g., MP4 file). The processing device can also encode the metadata for the subset of media items in the data package. In one implementation, the processing device encodes the wrapped cryptography keys for the encrypted media items in the data package. In one implementation, the processing device encodes the advertisement data for the for the encrypted media items in the data package.

In one implementation, the processing device creates schedule data for the subset of media items and encodes the schedule data in the data package. The processing device can create the schedule data based on configuration data that is stored on a data store coupled to the media server. The schedule data can include, for example, one or more satellite channels of the satellite broadcast system, and one or more time slots for which the satellite broadcast system is to use to provide the selected subset of media items in the data package to users.

At block 314, the processing device determines whether to create state data for the encrypted media items. The state data can include a mapping of decryption keys that can be used for decrypting the encrypted media items to the media identifiers of the encrypted media items. The processing device can make the determination of whether to create state data based on configuration data stored in the data store that is coupled to the media server. In one implementation, the configuration data indicates that a wrapped cryptography key is being sent with the corresponding encrypted media item to the satellite broadcast system. When the wrapped cryptography keys are sent with the encrypted media items, the processing device does not create state data for the encrypted media items.

In another implementation, the configuration data indicates that no wrapped cryptography keys are being sent with the corresponding encrypted media items to the satellite broadcast system. When no wrapped cryptography keys are being sent with the encrypted media items, the processing device makes a determination to create state data for the encrypted media items.

At block 316, the processing device creates the state data for the encrypted media item(s). The state data can be a data structure that includes an entry for each encrypted media item. Each entry can map a media identifier for the encrypted media item to a decryption key for the encrypted media item, and/or an identifier for the cryptography algorithm that is used to encrypt the media item. The processing device can generate decryption keys for the corresponding encrypted media items and populate the data structure with the decryption keys. The processing device can store the state data in a data store that is coupled to the media server.

At block 318, the processing device transmits the data package to the satellite broadcast system. The data package can be a video format file (e.g., MP4 file) that contains the encrypted raw media file for each media item and metadata for each encrypted raw media file. In one implementation, the data package (e.g., MP4 file) contains a wrapped cryptography key for each encrypted raw media file. In one implementation, the data package contains schedule data for the encrypted raw media files. The data package can be for media items that are scheduled for a particular time period (e.g., a particular day, a particular week).

The processing device can establish a high-speed Internet connection, such as a Fiber connection, with the satellite broadcast system, and sends the data package to the satellite broadcast system via the high-speed Internet connection. In one implementation, the processing device sends the data package to a content server in the satellite broadcast system. The processing device can also send schedule data for the encrypted media item(s) to the user device using a low-bandwidth communication protocol (e.g., SMS messaging, MMS messaging, and voice/audio and data cellular networking).

Figure 4:
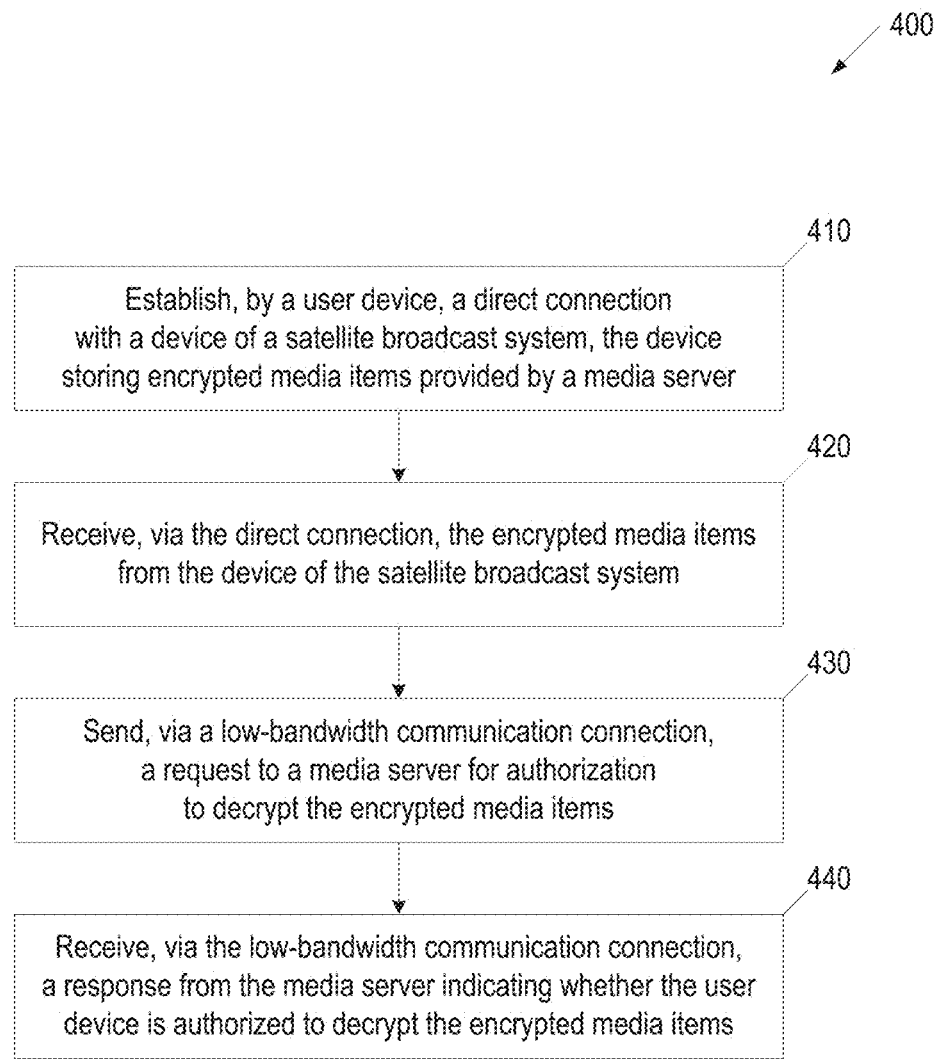
FIG. 4 depicts a flow diagram of a method for obtaining online media content via a satellite broadcast system, in accordance with one implementation of the present disclosure.

FIG. 4 depicts a flow diagram of a method 400 for obtaining online media content via a satellite broadcast system, in accordance with one implementation of the present disclosure. The method 400 is performed by processing logic that may comprise hardware (circuitry, dedicated logic, etc.), software (such as is run on a general purpose computer system or a dedicated machine), or a combination of both. In one implementation, the method is performed by a connection component 143, a satellite interface component 145, and/or an authorization component 147 in a user device 140 of FIG. 1. In one implementation, a processing device of a user device (e.g., user device 140 in FIG. 1) performs method 400.

At block 410, the processing device establishes a direct connection with a device of a satellite broadcast system. The device can store encrypted media items that are provided by a media server (e.g., media server 120 of a content sharing platform in FIG. 1). The device can be a satellite set top box (e.g., satellite set top box 110 in FIG. 1). The direct connection can be, for example, a USB connection, a Bluetooth® connection, or a Wi-Fi® connection.

At block 420, the processing device receives, via the direct connection, the encrypted media items from the device of the satellite broadcast system. In one implementation, the processing device receives multiple (e.g., all) of the encrypted media items that are available for download. For example, there may be 20 encrypted media items (e.g., videos, audio, etc.) on the satellite device (e.g., satellite set top box) that are available for download, and the processing device may receive all 20 of the encrypted media items. The encrypted media items can be made available for download on particular satellite channel(s) at particular time slot(s) as specified by schedule data that is associated with the encrypted media items.

In another implementation, a user selects a subset of the encrypted media items to download, and the processing device can receive the selected subset of the encrypted media items, for example, based on user input specifying which encrypted medias item should be downloaded. For example, there may be 20 encrypted media items on the satellite device that are available for download, and the processing device may receive 10 encrypted media items.

Prior to the processing device receiving the encrypted media items from the satellite device (e.g., satellite set top box), the satellite device can receive a command indicating which of the encrypted media items should be transferred to the user device. The satellite device can receive the command from an application (e.g., application 148 in FIG. 1) on the user device, or from an application on the satellite device. For example, the satellite device can run an application to display a satellite system UI, which includes information about the encrypted media items that are available for download, on a television set. A user can use an input device (e.g., remote control) (e.g., input device 119 in FIG. 1) to select, from the satellite UI, which encrypted media items to download. The satellite device can receive a command that indicates which encrypted media items to download from the application on the satellite device. In another example, the user device runs an application (e.g., application 148 in FIG. 1) to display a UI, which includes information about the encrypted media items that are available for download, on a display of the user device. The user can use an input device (e.g., touch screen, mouse, keyboard, selection device, etc.) to select encrypted media items to download.

The satellite device can receive, from the user device via a direct connection with the user device, a command that indicates which encrypted media items to download from the application on the user device. The command can include media identifiers, satellite channel identifiers, and/or time slot(s) for the selected encrypted media items to be transferred to the user device.

In one implementation, the user device is coupled to the satellite device (e.g., satellite set top box), via a direct connection, at any point in time during the scheduled time slot(s) that the encrypted media items are made available for download, and the processing device receives the encrypted media items during the scheduled time slot(s).

In another implementation, the user device is not coupled to the satellite device (e.g., satellite set top box) at any time during the scheduled time slot(s) that the encrypted media items are made available for download, and the satellite device stores the encrypted media items, which the user has selected for download, to a local data store on the satellite device. When user device is coupled to the satellite device (e.g., satellite set top box), via a direct connection, outside of the scheduled time slot(s), the processing device can download the encrypted media items from the data store on the satellite device.

In one implementation, the satellite device stores one data package that contains multiple encrypted raw media files (e.g., encrypted raw video files). The data package can be file that is encoded in a digital multimedia container format, such as MPEG-4 (also known as MP4). The MP4 file can contain multiple encrypted raw media files, and the corresponding metadata for the encrypted raw media files. In one implementation, the data package includes a wrapped cryptography key for each encrypted media item. For example, the MP4 file contains 20 encrypted video files, the corresponding metadata for the 20 encrypted video files, and optionally, 20 wrapped cryptography keys. The satellite device can decode the data package (e.g., MP4 file) in order to access the individual encrypted raw media files (e.g., 20 encrypted video file), the corresponding metadata, and optionally, wrapped cryptography keys. The satellite device can select the subset of the encrypted raw media files (e.g., 20 encrypted video file), which the user has selected, the corresponding metadata, and optionally, wrapped cryptography keys, and send those particular files, metadata, and optionally, wrapped cryptography keys to the user device.

In another implementation, the satellite device stores a data package (e.g., MP4 file) for each encrypted raw media file, and the satellite device sends multiple data packages (e.g., MP4 files) to the user. The processing device can receive a data package (e.g., MP4 file) for each of the selected encrypted media items. Each file (e.g., MP4 file) can contain an encrypted raw media (e.g., video, audio) file, metadata for the encrypted raw media file, and optionally, a wrapped cryptography key. For example, the data package (e.g., MP4 file) for a video titled "Summer Song" for "Rock-Band-XYZ" may include a raw video file, for example, in AVI video file format, for the video that is encrypted using, for example, a symmetric cryptography key, metadata that includes the title and name of the rock band, and optionally, a wrapped cryptography key.

At block 430, the processing device sends, via a low-bandwidth communication connection, a request to a media server for authorization to decrypt the encrypted media items. The low-bandwidth communication connection can be a Short Message Service (SMS) messaging connection. The request can be sent to the media server while the processing device is receiving the encrypted media items from the satellite device, after the processing device has received the encrypted media items, and/or when a user attempts to play a downloaded media item.

The request can include a small amount of data to be sent over the low-bandwidth communication connection. The processing device can send one or more requests to the media server. Each request can include data for one or more encrypted media items that have been downloaded to the user device. For example, the processing device can send a single request that includes data for all of the downloaded encrypted media items. In another example, the processing device can send a request for each encrypted media item as it is being downloaded. In another example, the processing device can send a request for an encrypted media item when a user attempts to play the encrypted media item.

In one implementation, the processing device receives one or more data packages (e.g., MP4 files) that contain individual encrypted raw media files, the corresponding metadata, and optionally, the corresponding wrapped cryptography keys. The processing device can decode the downloaded data packages (e.g., MP4 files) to access individual encrypted raw media files, the corresponding metadata, and optionally, the corresponding wrapped cryptography keys. In another implementation, the processing device directly receives individual encrypted raw media files, the corresponding metadata, and optionally, the corresponding wrapped cryptography keys from the satellite device.

The processing device then extracts the media identifiers from the metadata for the encrypted media items, and includes the media identifiers in the request that is sent to the media server. In one implementation, the processing device includes the corresponding wrapped cryptography keys in the request. The processing device can extract other information from user device, such as, geographic information for the user device, and can include the geographic information in the request. The user device can include global positioning system (GPS) receivers, and the processing device can obtain geographic information from the GPS receivers and include, for example, GPS data in the request.

At block 440, the processing device receives, via the low-bandwidth communication connection, a response from the media server indicating whether the user device is authorized to decrypt the encrypted media items. In one implementation, the response is received via the same type of low-bandwidth communication connection that was used to send the request. For example, the processing device may send the request as a SMS message, and the received response may also be a SMS message. In another implementation, the response is received via a different type of low-bandwidth communication connection than which the request was sent. For example, the processing device may send the request as a SMS message, and the received response may be a MMS message.

The response can indicate that the user device is authorized to decrypt one or more of the encrypted media items and/or is not authorized to decrypt one or more of the encrypted media items. The response is described in greater detail below in conjunction with FIG. 5. For example, the response may indicate that the user device is authorized to decrypt seven of the ten encrypted media items that were downloaded to the user device. The response can include a decryption key for each of the encrypted media items that the user device is authorized to decrypt. For example, the response may include seven decryption keys. The processing device can use a decryption key for a particular encrypted media item to decrypt the encrypted raw media file for the particular encrypted media item. If the response is received via a voice call, which includes decryption key encoded in audio, the processing device can decode the encoded audio of the encryption key into a byte key.

In one implementation, the response includes advertisement data for the media items. The advertisement data can include one or more digital images (e.g., JPEGS) and/or one or more audio clips to create an advertisement that can be presented before, during or after presenting the media items on the user device.

Upon decrypting a media item, the processing device can perform a data integrity check of the decrypted media item prior to the decrypted media item being played. The processing device can perform a checksum function or a hash function (e.g., VIPER hash) using data of the frames of the decrypted media item as input to verify the data integrity of the decrypted media item. In one implementation, the metadata of the media item include checksum results or hash results for the frames. The processing device can perform the checksum functions and/or hash functions and compare the result(s) to the checksum results and/or hash results in the metadata. In one implementation, the metadata does not include the checksum results and/or hash results for the frames and the processing device receives the checksum results and/or hash results for the frames in the response received at block 440.

In one implementation, if the data integrity check of the decrypted media item fails, the processing device deletes the decrypted media item from the user device. In one implementation, when the encrypted media item is available for download from a satellite device (e.g., satellite set top box), the processing device downloads the encrypted media item from the satellite device, decrypts the encrypted media item, and performs a data integrity check of the decrypted media item. In one implementation, the processing device can continue to delete the decrypted media item, download and decrypt the encrypted media item, and perform a data integrity check of the decrypted media item until the data integrity check fails or an attempt threshold is met. In one implementation, the processing device notifies a user if the data integrity check fails.

Figure 5:
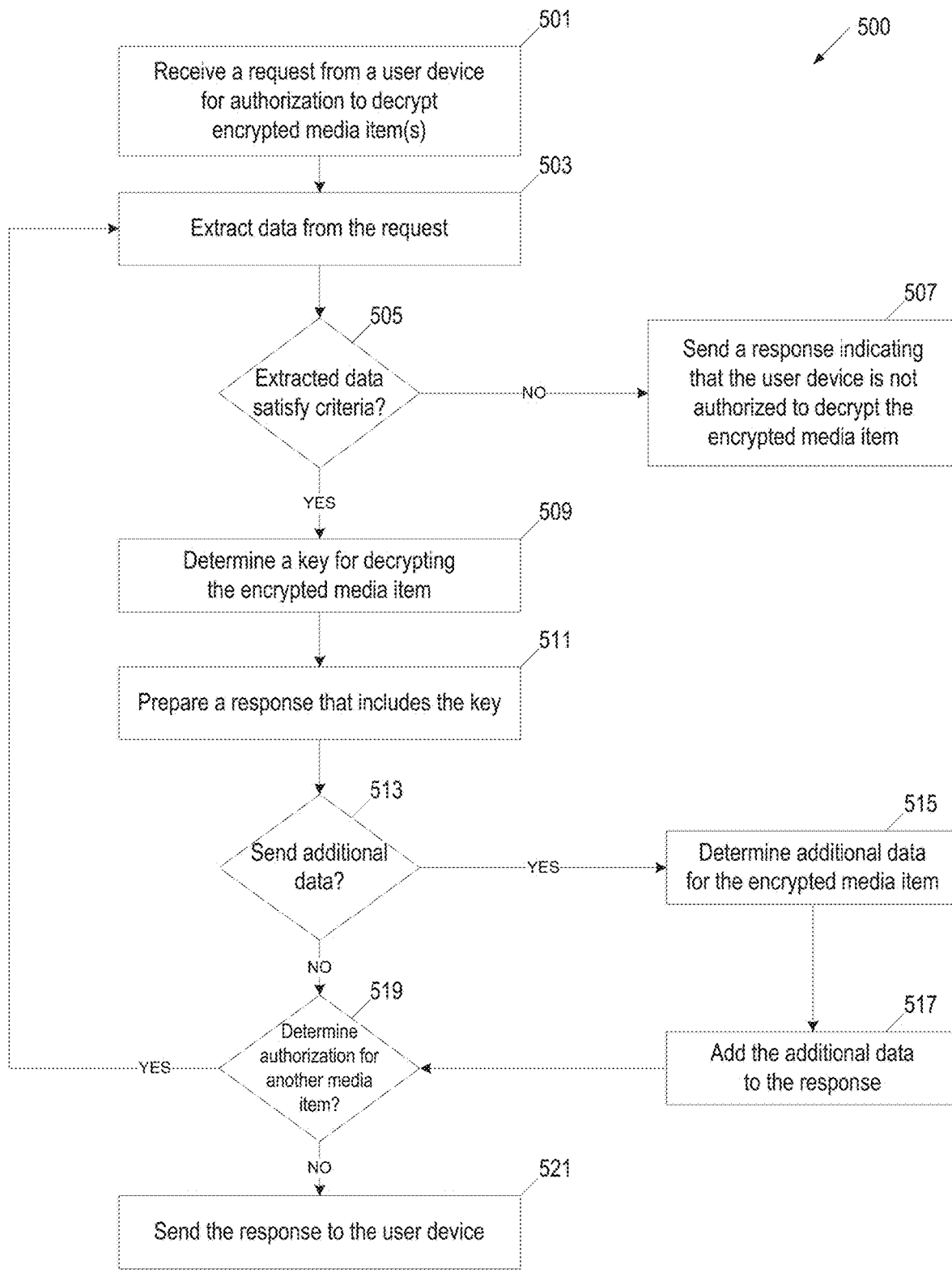
FIG. 5 depicts a flow diagram of a method for controlling access to online media content being shared with users via a satellite broadcast system, in accordance with one implementation of the present disclosure.

FIG. 5 depicts a flow diagram of a method 500 for controlling access to online media content being shared with users via a satellite broadcast system, in accordance with one implementation of the present disclosure. The method 500 is performed by processing logic that may comprise hardware (circuitry, dedicated logic, etc.), software (such as is run on a general purpose computer system or a dedicated machine), or a combination of both. In one implementation, the method is performed by a control access component 125 in a media server 120 of FIG. 1, while in some other implementations one or more blocks of FIG. 5 may be performed by another machine. In one implementation, a processing device of a media server computing machine (e.g., media server 120 in FIG. 1) performs method 500.

At block 501, the processing device receives a request from a user device for authorization to decrypt one or more encrypted media items. At block 503, the processing device extracts data from the request and determines whether the extracted data satisfies one or more criteria at block 505. The processing device can extract one or more media identifiers from the request and locate the one or more criteria associated with the media identifiers. The criteria for each media item can be stored as part of configuration data in a data store that is coupled to the processing device. The criteria can be specified by the owner of the media item. The criteria may be based the content of the media item, geographic locations, licensing constraints, and/or copyright constraints associated with the media item. The criteria can include, for example, geographic locations for playing the media item, authorization by the owner of the media item, device platform (e.g., mobile device, desktop device) for playing the media item, operating system of the device playing the media item, credentials of a user, or a combination of such.

For example, the media item owner of Video-XYZ may set a criterion that owner permission should be granted in order for the Video-XYZ to be decrypted and played. The processing device can create and store attribute data for the encrypted media items indicating whether the owners of each of the encrypted media items have granted permission for the corresponding encrypted media items to be decrypted and played. For example, the attribute data can have an entry for the media identifier for Video-XYZ indicating that the owner has granted permission for Video-XYZ to be decrypted. The media item owner of Video-XYZ may later decide that the media item (e.g., Video-XYZ) should not be decrypted and/or played because of a copyright violation, and the entry in the attribute data for Video-XYZ can be changed to indicate that the owner has does not grant permission for Video-XYZ to be decrypted.

When the processing device receives the request, the processing device may extract the media item identifier for Video-XYZ that is included in the request, and may determine at block 505, that the entry for media item identifier for Video-XYZ in the attribute data indicates that the owner has does not grant permission for Video-XYZ to be decrypted, and that the one or more criteria is not satisfied. If one or more criteria are not satisfied at block 505, the processing device can send a response indicating that the user device is not authorized to decrypt the media item at block 507.

In another example, the criteria for a media item may include one or more geographic regions that are approved for playing the media item. For example, the criteria for Video-XYZ may be that Video-XYZ can be played only in Australia. When the processing device receives the request, the processing device may extract geographic information (e.g., GPS data) that is included in the request, and may determine at block 505, that the geographic information satisfies the criterion of being a geographic location in Australia.

If the one or more criteria are satisfied at block 505, the processing device can determine a key for decrypting the media item at block 509. In one implementation, the processing device determines the decryption key by extracting a wrapped cryptography key that is included in the request, and unwrapping the wrapped cryptography key. The unwrapped key can be used to decrypt the encrypted media item. Unwrapping the encryption key can involve a similar cryptographic system that was used to wrap the encryption key and may utilize a private key associated with the media server key.

In one implementation, there is no wrapped cryptography key in the request, and the processing device determines the decryption key by using the media identifier from the request to look up the decryption key in state data on the media server. The state data can have an entry corresponding to the media identifier, and the entry can include the decryption key and/or the cryptography algorithm used to encrypt the media item. If the entry does not include the decryption key, the processing device can determine the decryption key using the cryptography algorithm in the entry. For example, if the cryptography algorithm is a symmetric algorithm, such as Advanced Encryption Standard (AES), the processing device can determine that the decryption key may be the same key used to encrypt the media item, or a slightly transformed version of the key used to encrypt the media item. In another example, if the cryptography algorithm is an asymmetric algorithm that, for example used a public key to encrypt the media item, the processing device can determine that the decryption key is a corresponding private key.

At block 511, the processing device prepares a response that includes the key for decrypting the media item. At block 513, the processing device determines whether to send additional data to the user device. The additional data can be supplemental media items, such as advertisement data and/or recommended media items (e.g., recommended videos). The processing device can make the determination based on configuration data that specifies whether additional data should be sent for the encrypted media item, whether additional data was already sent with the encrypted media items as part of a data package sent to a satellite broadcast system, and/or whether additional data should be sent for the encrypted media item if the user device is authorized to decrypt the media item.

If additional data should not be sent to the user device, the processing device decides whether to determine authorization for another media item at block 519. If additional data should be sent to the user device, the processing device determines the additional data at block 515. The request from the user device can include geographic information (e.g., GPS data) of the user device, a device platform (e.g., mobile device, desktop device) identifier for user device, operating system of the user device, credentials of a user, or a combination of such. The processing device can determine advertisement data based on data in the request. The processing device can be coupled to a recommendation platform and/or a promotion platform that can provide the processing device with advertisement data for the media item based on data in the request. The advertisement data can include one or more digital images (e.g., JPEGS) and/or one or more audio clips to create an advertisement that can be presented before, during or after presenting the media item on one or more of the user device. In one implementation, the processing device encrypts the additional data.

At block 517, the processing device adds the additional data for the encrypted media item to the response. At block 519, the processing device decides whether to determine authorization for another media item. The request received at block 501 can be for authorization to decrypt multiple encrypted media items and can include multiple media identifiers. If the processing device should determine authorization for another encrypted media item, the processing device returns to block 503 to extract data for the other encrypted media item from the request. If the processing device does not determine authorization for another encrypted media item, the processing device sends the response, which includes the decryption key(s) and/or additional data for the encrypted media item(s), to the user device at block 521.

The processing device can send the response via SMS messaging, MMS messaging, and/or voice/audio and data cellular networking. For example, the processing device can send one or more SMS messages that contain the key(s) and/or additional data (e.g., advertising data), and/or one or more MMS messages that contain the key(s) and/or additional data (e.g., advertising data) to the user device. In another example, the processing device can encode they key(s) and/or additional data (e.g., advertising data) into audio data, and send the response as audio data to the user device over a voice call.

Figure 6:
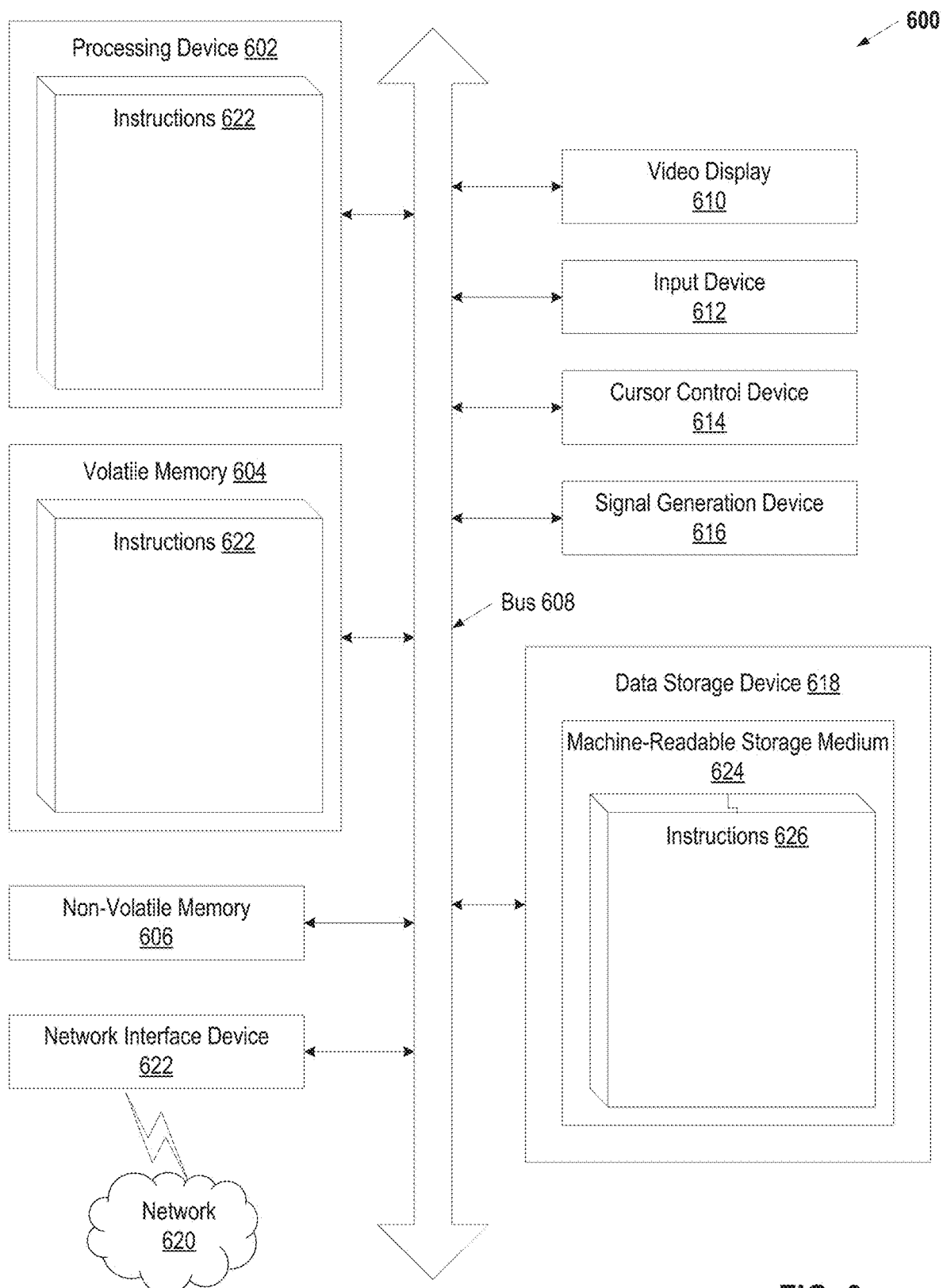
FIG. 6 depicts a block diagram of an example computing device operating in accordance with one or more aspects of the present disclosure.

FIG. 6 depicts a block diagram of a computer system operating in accordance with one or more aspects of the present disclosure. In certain implementations, computer system 600 may be connected (e.g., via a network, such as a Local Area Network (LAN), an intranet, an extranet, or the Internet) to other computer systems. Computer system 600 may operate in the capacity of a user device. Computer system 600 may operate in the capacity of a server or a client computer in a client-server environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an input device 1512 (e.g., a keyboard, an alphanumeric keyboard, a motion sensing input device, touch screen), a cursor control device 614 (e.g., a mouse), and a signal generation device 616.

Data storage device 618 may include a non-transitory machine-readable storage medium 624 on which may store instructions 626 encoding any one or more of the methods or functions described herein, including instructions encoding components of media server 120 of FIG. 1 for implementing methods 200, 300, and 500, and/or components of user device 140 of FIG. 1 for implementing method 400.

Instructions 626 may also reside, completely or partially, within volatile memory 1504 and/or within processing device 602 during execution thereof by computer system 600, hence, volatile memory 604 and processing device 602 may also constitute machine-readable storage media.

While machine-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "selecting," "encrypting," "transmitting," "receiving," "determining," "creating," "extracting," "establishing," "sending," "decrypting," "sending," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200, 300, 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   selecting, by a processing device of a media server, a media item to be provided for user consumption via a satellite broadcast system;
   transmitting, by the media server via a first communication protocol, the media item encrypted into an encrypted media item using an encryption key to the satellite broadcast system;
   receiving, by the media server via a second communication protocol that is different from the first communication protocol, a request from a user device for authorization to decrypt the encrypted media item obtained by the user device via a direct connection with the satellite broadcast system;
   extracting a media identifier and geographic data of the user device from the request;
   determining, by the media server, whether the media identifier and the geographic data satisfy one or more criteria;
   determining, by the media server, whether the user device is authorized to decrypt the encrypted media item based on whether the media identifier and the geographic data extracted from the request satisfy the one or more criteria;
   providing, by the media server to the satellite broadcast system, schedule data comprising a scheduled time period for availability of the media item;
   causing, by the media server based on the schedule data, the media item to be available at the scheduled time period for download to the user device via the satellite broadcast system; and
   transmitting, by the media server at the scheduled time period, a key to the user device for decrypting the encrypted media item in response to the user device being authorized to decrypt the encrypted media item.

2. The method of claim 1, wherein the second communication protocol is Short Message Service (SMS) messaging, Multimedia Message Service (MMS) messaging, or voice and data cellular networking.

3. The method of claim 2, wherein the key is transmitted by the media server to the user device via at least one of SMS messaging, MMS messaging, or voice and data cellular networking.

4. The method of claim 1, further comprising:
   prior to transmitting the encrypted media item to the satellite broadcast system, creating, by the media server, mapping data that associates the key with the encrypted media item; and
   storing the mapping data locally at the media server.

5. The method of claim 1, wherein the key is an asymmetric key.

6. The method of claim 1, wherein determining whether the user device is authorized to decrypt the media item further comprises:
determining whether the media identifier and the geographic data satisfy one or more criteria; and
determining that the user device is authorized to decrypt the encrypted media item responsive to the media identifier and the geographic data satisfying the one or more criteria.

7. The method of claim 1, wherein selecting the media item is based on at least one of a geographic location for consuming the media item, a device platform for consuming the media item, an operating system for consuming the media item, a ranking of the media item, a rating of the media item, a duration of the media item, a language associated with the media item, or content of the media item.

8. A method comprising:
establishing, by a processing device of a user device, a direct connection with a device of a satellite broadcast system, the device storing a plurality of encrypted media items provided by a media server;
receiving, via the direct connection, the plurality of encrypted media items from the device of the satellite broadcast system;
sending, by the user device, via a low-bandwidth communication connection between the user device and the media server, a request to the media server for authorization to decrypt the plurality of encrypted media items, wherein the request comprises a media identifier and geographic data of the user device;
receiving, via the low-bandwidth communication connection during occurrence of a scheduled time period, a response from the media server indicating whether the user device is authorized to decrypt the plurality of encrypted media items, wherein the authorization is based on whether the media identifier and the geographic data extracted from the request satisfy one or more criteria, and wherein the scheduled time period is specified in schedule data generated by the media server;
in response to receiving the response indicating that the user device is authorized to decrypt the plurality of encrypted media items, extracting, by the user device from the response, a plurality of keys for decrypting the plurality of encrypted media items; and
obtaining, from the satellite broadcast system, the media item during the scheduled time period, wherein the satellite broadcast system to provide the media item for download during the scheduled time period based on the schedule data from the media server;
wherein the response and the plurality of keys are transmitted concurrently responsive to occurrence of the request during a scheduled time period.

9. The method of claim 8, further comprising:
determining a subset of the plurality of encrypted media items to receive from the device of the satellite broadcast system, wherein the determining is based on user input indicating a selection of the subset of the plurality of encrypted media items.

10. The method of claim 8, wherein the device is a satellite set top box.

11. The method of claim 8, wherein the direct connection between the user device and the satellite set top box is a Universal Serial Bus (USB) connection, a Bluetooth connection, or a Wi-Fi connection.

12. The method of claim 8, further comprising:
decrypting the plurality of encrypted media items using the plurality of keys.

13. The method of claim 8, wherein the request is sent to the media server via Short Message Service (SMS) messaging, Multimedia Message Service (MMS) messaging, or voice and data cellular networking.

14. The method of claim 8, wherein sending the request comprises:
determining the geographic data of the user device; and
sending the geographic data of the user device as part of the request.

15. A non-transitory computer readable medium having instructions stored thereon that, when executed by a processing device, cause the processing device to perform operations comprising:
selecting, by the processing device of a media server, a media item to be provided for user consumption via a satellite broadcast system;
encrypting the media item using an encryption key to generate an encrypted media item;
transmitting, via a first communication protocol, the encrypted media item to the satellite broadcast system;
receiving, via a second communication protocol that is different from the first communication protocol, a request from a user device for authorization to decrypt the encrypted media item obtained by the user device via a direct connection with the satellite broadcast system;
extracting a media identifier and geographic data of the user device from the request;
determining, by the media server, whether the media identifier and the geographic data satisfy one or more criteria;
determining whether the user device is authorized to decrypt the encrypted media item based on whether the media identifier and the geographic data extracted from the request satisfy the one or more criteria;
providing, by the media server to the satellite broadcast system, schedule data comprising a scheduled time period for availability of the media item;
causing, by the media server based on the schedule data, the media item to be available at the scheduled time period for download to the user device via the satellite broadcast system; and
transmitting, at the scheduled time period, a key to the user device for decrypting the encrypted media item in response to the user device being authorized to decrypt the encrypted media item.

16. The non-transitory computer readable medium of claim 15, wherein the second communication protocol is Short Message Service (SMS) messaging, Multimedia Message Service (MMS) messaging, or voice and data cellular networking.

17. The non-transitory computer readable medium of claim 16, wherein the response is transmitted by the media server to the user device via at least one of SMS messaging, MMS messaging, or voice and data cellular networking.

18. The non-transitory computer readable medium of claim 15, the operations further comprising:
prior to transmitting the encrypted media item to the satellite broadcast system, creating mapping data that associates the key with the encrypted media item; and
storing the mapping data in a local data store.

19. The non-transitory computer readable medium of claim 15, wherein determining whether the user device is authorized to decrypt the media item comprises:

determining whether the media identifier and the geographic data satisfy one or more criteria; and determining that the user device is authorized to decrypt the encrypted media item in response to the media identifier and the geographic data satisfying the one or more criteria.

20. The non-transitory computer readable medium of claim 15, wherein selecting the media item is based on at least one of a geographic location for consuming the media item, a device platform for consuming the media item, an operating system for consuming the media item, a ranking of the media item, a rating of the media item, a duration of the media item, a language associated with the media item, or content of the media item.

\* \* \* \* \*